(12) United States Patent
Håkansson et al.

(10) Patent No.: US 9,169,960 B2
(45) Date of Patent: Oct. 27, 2015

(54) HEIGHT ADJUSTABLE STAND FOR SCREEN OR DISPLAY

(71) Applicant: SMS SMART MEDIA SOLUTIONS AB, Nacka (SE)

(72) Inventors: Jonas Håkansson, Nacka (SE); Petter Åstradsson, Vaxholm (SE)

(73) Assignee: SMS Smart Media Solutions AB, Nacka (SE)

( * ) Notice: Subject to any disclaimer, the term of this patent is extended or adjusted under 35 U.S.C. 154(b) by 0 days.

(21) Appl. No.: 14/389,904

(22) PCT Filed: Feb. 11, 2013

(86) PCT No.: PCT/SE2013/050109
§ 371 (c)(1),
(2) Date: Oct. 1, 2014

(87) PCT Pub. No.: WO2013/151475
PCT Pub. Date: Oct. 10, 2013

(65) Prior Publication Data
US 2015/0076311 A1    Mar. 19, 2015

(30) Foreign Application Priority Data
Apr. 2, 2012    (SE) ...................................... 1250328

(51) Int. Cl.
*F16M 11/18*    (2006.01)
*F16M 11/04*    (2006.01)
*F16M 11/24*    (2006.01)
*G03B 21/56*    (2006.01)
*F16M 11/42*    (2006.01)

(52) U.S. Cl.
CPC ............. *F16M 11/046* (2013.01); *F16M 11/18* (2013.01); *F16M 11/24* (2013.01); *F16M 11/42* (2013.01); *G03B 21/56* (2013.01)

(58) Field of Classification Search
CPC ....... F16M 11/04; F16M 11/24; F16M 11/22; F16M 11/046; F16M 11/30; G03B 21/10; G03B 21/56; G09F 2007/1834
See application file for complete search history.

(56) References Cited

U.S. PATENT DOCUMENTS 4,662,524 A * 5/1987 Fullenkamp et al. ......... 211/190
6,189,849 B1 * 2/2001 Sweere et al. ............. 248/286.1
(Continued)

FOREIGN PATENT DOCUMENTS

| CA | 2 713 016 A1 | 2/2012 |
| CA | 2 748 768 A1 | 2/2012 |

(Continued)

*Primary Examiner* — Bradley Duckworth
(74) *Attorney, Agent, or Firm* — Dickstein Shapiro LLP

(57) ABSTRACT

A height adjustable stand (1) comprises a base (3) for arrangement on a floor (5), at least a first base beam (6) and a second base beam (8). The stand comprises a movable structure (12) which is movable along the base beams (6, 8) and which is arranged between a front plane and a back plane. The stand (1) comprises at least a first front plate (13) which is arranged with a first and second vertical slit (14) between the front plate (13) and the first and second base beam (6, 8), respectively, a mount (2) arranged on the outside of the front plate (13) and connected to the movable structure (12), and a first and second connecting means (18, 19) arranged through the first and second slit (14), respectively, wherein each connecting means (18) is connected to the movable structure (19) and the mount (2), which mount (2) is arranged to receive the projector screen or the display.

13 Claims, 8 Drawing Sheets

(56) References Cited

U.S. PATENT DOCUMENTS

| | | |
|---|---|---|
| 7,036,787 B1 | 5/2006 | Lin |
| 7,044,423 B2* | 5/2006 | Bober et al. ............... 248/188.4 |
| 7,195,213 B2* | 3/2007 | Weatherly ................. 248/125.1 |
| 7,537,184 B1 | 5/2009 | Basilicato et al. |
| 7,708,237 B2* | 5/2010 | Mummert et al. ......... 248/122.1 |
| 7,793,897 B2* | 9/2010 | Wang et al. ................ 248/125.2 |
| 8,267,366 B2* | 9/2012 | Cheng et al. ............. 248/297.31 |
| 8,403,273 B2* | 3/2013 | Takamatsu et al. ........ 248/122.1 |
| 8,693,093 B2* | 4/2014 | Kepley, Jr. .................... 359/443 |
| 8,814,107 B2* | 8/2014 | Hampe et al. ................. 248/121 |
| 2005/0230573 A1* | 10/2005 | Ligertwood .................. 248/158 |
| 2006/0238086 A1* | 10/2006 | Lai ............................. 312/319.5 |
| 2007/0241252 A1* | 10/2007 | Wei-Shin ................. 248/297.21 |
| 2007/0247795 A1* | 10/2007 | Tseng ........................... 361/681 |
| 2008/0068784 A1* | 3/2008 | Bouissiere ................... 361/681 |
| 2008/0251656 A1* | 10/2008 | Prismall ....................... 248/121 |
| 2009/0015798 A1 | 1/2009 | Unsworth |
| 2009/0057501 A1* | 3/2009 | Huang ........................... 248/157 |
| 2009/0166302 A1* | 7/2009 | Hung ........................... 211/26.1 |
| 2010/0006715 A1* | 1/2010 | Wills et al. ..................... 248/121 |
| 2010/0045943 A1 | 2/2010 | Gillespie |
| 2011/0079695 A1* | 4/2011 | Sun ............................. 248/286.1 |
| 2011/0233346 A1* | 9/2011 | Schluter ........................ 248/65 |
| 2012/0261362 A1* | 10/2012 | Skull et al. ....................... 211/26 |
| 2013/0114048 A1* | 5/2013 | Konjhodzic et al. ........... 353/79 |
| 2013/0168335 A1* | 7/2013 | Gillespie ......................... 211/26 |
| 2015/0001355 A1* | 1/2015 | Huang ..................... 248/123.11 |

FOREIGN PATENT DOCUMENTS

| | | |
|---|---|---|
| WO | WO 00/46638 A1 | 8/2000 |
| WO | WO 2012/008897 A1 | 1/2012 |

\* cited by examiner

DETAIL B

SECTION A-A

HEIGHT ADJUSTABLE STAND FOR SCREEN OR DISPLAY

TECHNICAL FIELD

The present invention relates to a stand for a screen or a display. More specifically the present invention relates to a stand for a display or a projector screen and possibly also a short throw projector, which is to be arranged on the projector screen stand together with a screen.

DESCRIPTION OF THE PRIOR ART

When presenting information stored in a computer it is possible to connect the computer to a projector, which shows the files stored on the computer. In recent years so called "short-throw-projectors" have entered the market. Short throw projectors are sometimes referred to as "ultra short throw projectors". In the following description the term "short throw projector" will be used for both types of projectors. Such projectors can be placed at a short distance from the screen on which the images from the projector are projected. Such projectors are normally arranged on an arm which extends from the screen so that the projector and screen are arranged fixed in relation to each other.

In order to facilitate the display of information, the screen and the projector may be arranged on a height adjustable stand so that the screen may be positioned at different heights above the surface on which the stand is arranged.

Another possibility for presenting information stored in a computer is to use a display. Displays are available in a large number of different sizes and may also be provided with a touch sensitive surface to provide an interactive display.

It is favourable to be able to adjust the height of the screen or the display to fit the height of the presenter or to fit the room in which the presentation is held.

CA2748768A1 describes a stands for a screen and a projector for placement on a floor.

SUMMARY OF THE INVENTION

An object of the present invention is to provide a height adjustable stand for a projector screen or a display, which is an alternative to the stands according to the prior art.

Another object of the present invention is to provide a height adjustable stand for a projector screen or a display, with which the risk for malfunction due to pinching of objects in the height adjustment mechanism is minimized.

A further object of the present invention is to provide a height adjustable stand, for a projector screen or a display, with which the risk for injuries caused by squeezing is minimized.

At least one of the above objects are fulfilled with a projector screen stand according to claim 1.

Further advantages of the invention are provided with the features of the dependent claims.

According to a first aspect of the invention a height adjustable stand for a projector screen or a display is provided. The stand comprises a base for arrangement on a floor, at least a first base beam with a first length axis and a second base beam with a second length axis, which length axes are essentially parallel and arranged to be essentially vertical when the base is arranged on a floor. The back sides of the base beams define a vertical back plane and the front sides of the base beams define a vertical front plane. The stand also comprises at least one base connecting member which connects the base beams, and a movable structure which is movable along the base beams and which is arranged between the front plane and the back plane. The stand is characterized in that the stand comprises at least a first front plate which is arranged with a first vertical slit between the front plate and the first base beam, and a second vertical slit between the front plate and the second base beam, at least a first back plate arranged to cover a majority of the area between the base beams, a mount arranged on the outside of the front plate and connected to the movable structure, and a first connecting means and a second connecting means arranged through the first slit and the second slit, respectively, wherein each connecting means is connected to the movable structure and the mount, which mount is arranged to receive the projector screen or the display.

By arranging a front plate according to the invention, so that only slits are open between the front plate and the base beams, the risk of people or material getting stuck or pinched between the movable structure and the base is minimized. The slits may be made very narrow while still providing sufficient strength for carrying the screen or display. The arrangement with a slit at each base beam provides for two connecting means. The provision of two connecting means also contributes to the sufficient combined strength of the connecting means.

Each one of the connecting means may comprise at least one plate. Plates are favourable to use as connecting means as they may be arranged in a narrow slit, they are relatively cheap to provide and they provide a good stability in the plane. Two plates arranged at a distance from each other provides good stability for the mount. Narrow slits are also favourable in that the risk of pinching anything in the slit thereby is minimized.

The back plate may be essentially flat and is arranged essentially in the back plane. This provides for a flat back surface as the back plate blends into the base beams. It is also possible to have the back plate curved.

The front plate may be essentially flat and may be arranged essentially in the front plane. This provides for the mount to be arranged as close as possible to the base beams.

The front plate, seen towards the base beams perpendicular to the front plane, may be arranged to cover a part of both base beams at a distance from the base beams so that the slits seen in cross section are curved. By having the front plate and the slits arranged in this way the risk of pinching persons or objects between the base and the movable structure is decreased further.

The front side of each base beam in cross section may have a form comprising a main surface part, an inward surface part defining the beginning of the slit with a convex bend between the main surface part and the inward surface part and an inner surface part with a concave bend between the inward surface part and the inner surface part, wherein the front plate, seen towards the base beams perpendicular to the front plane, is arranged to cover the inner surface part at least partially. Such a form on the base beams provides for a smooth transition between the surfaces of the base beams to the plate.

The inner surface part may be essentially flat and parallel to the front plane. The inward surface part is essentially flat and perpendicular to the front plane. This provides for easy manufacturing of the connecting means as the connecting means may be provided with bends in right angles.

The movable structure comprises a first structure beam and a second structure beam, which are arranged suspended in the base beams, and at least one structure connecting member, which connects the structure beams. It is possible to arrange the movable structure in other ways but by using structure beams the construction of the movable structure is facilitated. The structure beams as well as the base beams may be extruded.

The stand may comprise actuating means which is arranged to provide an upward force on the movable structure in relation to the base. By providing such actuating means the movable structure may be moved up and down along the base beams.

The actuating means may be arranged to provide a force between the base connecting member and the structure connecting member. It is of course possible to arrange the actuating means in other ways, but in this way the force from the actuating means may be centred to the centre of gravity of the movable structure and the display or the screen.

The actuating means may comprise at least one screw, at least one nut member and at least one electrical motor which is arranged to drive at least one of said at least one screw and said at least one nut member. This is a straightforward implementation of actuating means. As the actuating means may be arranged between the front plate and the back plate said at least one screw does not have to be covered but may be exposed between the motor and the nut member. The nut member may be only a nut or a tube with a nut arranged in the tube.

The screw may be arranged on the base and may be arranged to be driven by the electrical motor and the nut member may be arranged on the movable member. It is favourable to have the motor on the base member as the electrical cables to the motor then does not have to move in relation to the movable structure.

The actuating means may comprise at least one roll formed coil spring which is arranged to provide an upwardly directed force on the movable member in relation to the base. This is an alternative to the use of an electrical motor, a screw and a nut. The roll formed coil springs may be arranged in a suitable number and strength to essentially balance the weight of the movable structure and the display. The friction force between the movable structure and the base should be sufficiently strong to allow the movable structure to be still when no force is applied to the movable structure.

The movable structure may extend above the upper end of the first and second base beam, and the stand may comprise an upper mount arranged on the part of the movable structure extending above the upper end of the first and second base beam, which upper mount is arranged to receive the upper part of the projector screen or the display. With such an arrangement of the movable structure the stand may be reasonably low in a transport position while still providing the possibility to have a large screen on the stand.

In the following preferred embodiments of the invention will be described with reference to the appended drawings.

SHORT DESCRIPTION OF THE DRAWINGS

DESCRIPTION OF PREFERRED EMBODIMENTS OF THE INVENTION

Figure 1:
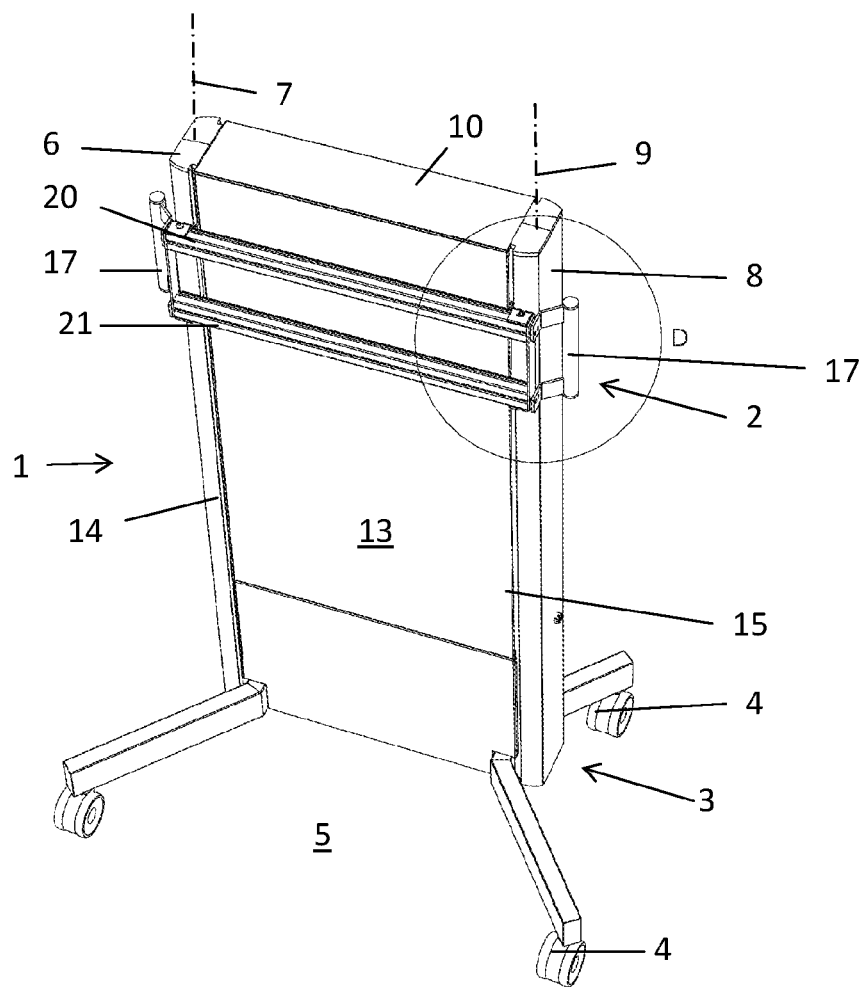
FIG. 1 is a front perspective view of a height adjustable stand according to a first embodiment of the present invention.

In the following description of preferred embodiments of the invention similar elements or features in different figures will be denoted with the same reference numeral. It is to be noted that the drawings are not drawn to scale.

Figure 2:
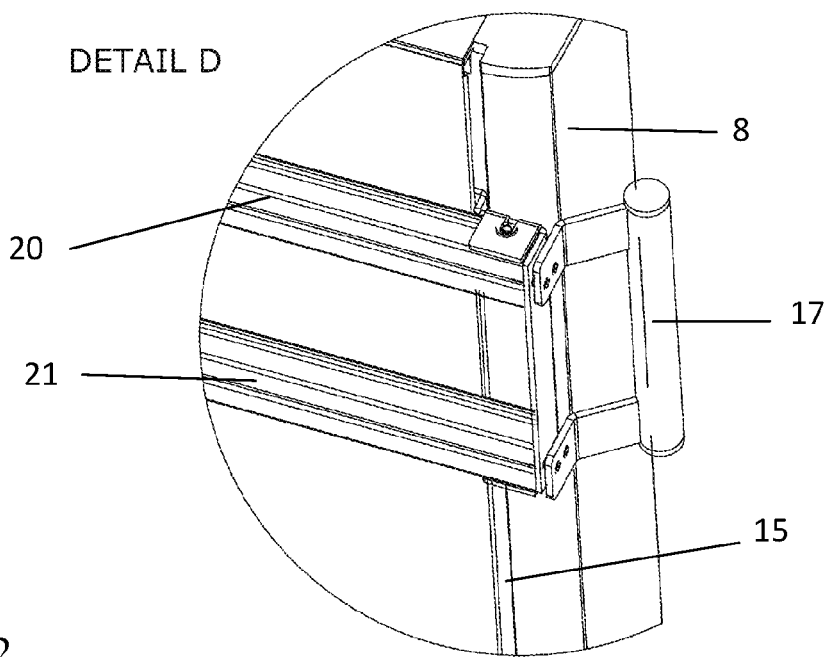
FIG. 2 is an enlargement of detail D in FIG. 1.
Figure 3:
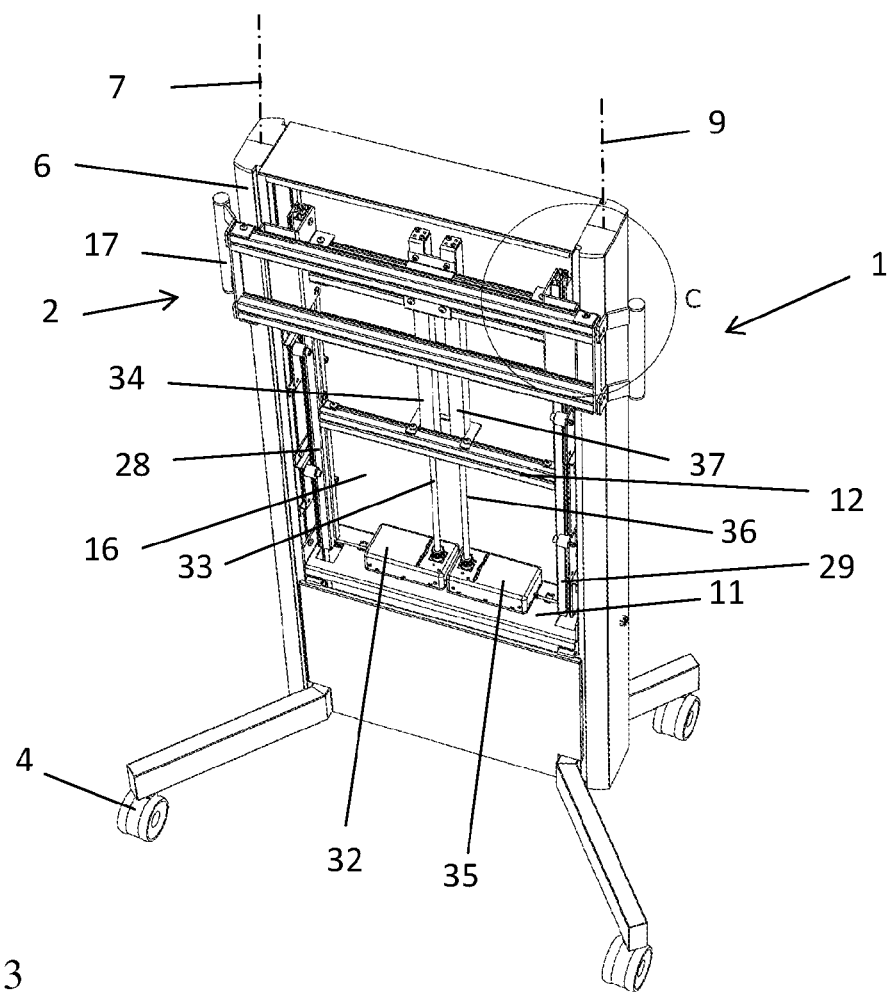
FIG. 3 is a front perspective view of the height adjustable stand of FIG. 1, with a front plate removed.
Figure 4:
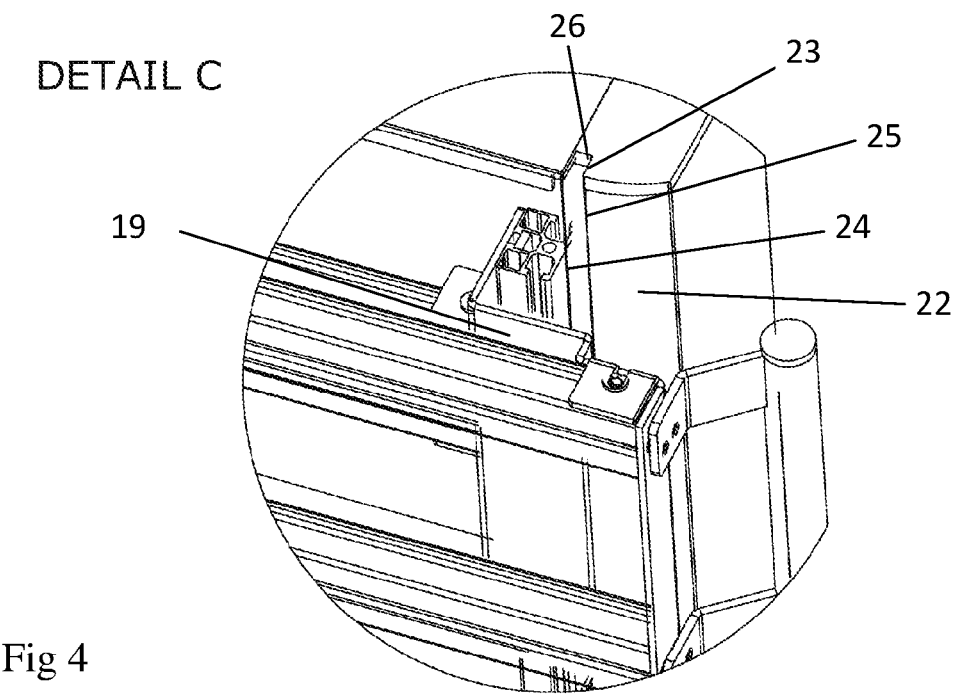
FIG. 4 is an enlargement of detail C in FIG. 3.

FIG. 1 is a front perspective view of a height adjustable stand 1 according to an embodiment of the present invention. FIG. 2 is an enlargement of detail D in FIG. 1. FIG. 3 is a front perspective view of the stand shown in FIG. 1, with a front plate removed. FIG. 4 is an enlargement of detail C in FIG. 3. The height adjustable stand 1 comprises a mount 2 for reception of a display. The height adjustable stand comprises a base 3 with four wheels 4 for arrangement on a floor 5. The stand further comprises a first base beam 6 with a first length axis 7 and a second base beam 8 with a second length axis 9, which length axes 7, 9, are essentially parallel and arranged to be essentially vertical when the base 3 is arranged on a floor 5. The back sides of the base beams 6, 8, define a vertical back plane and the front sides of the base beams 6, 8, define a vertical front plane. Base connecting members in the form of a top transversal beam 10 and a mid transversal beam 11 (FIG. 3) connect the base beams 6, 8. The stand also comprises a movable structure 12 (FIG. 3) which is movable along the base beams 6, 8. The stand 1 also comprises at least a first front plate 13 which is arranged with a first vertical slit 14 between the front plate 13 and the first base beam 6, and a second vertical slit 15 between the front plate 13 and the second base beam 8. The stand also comprises a first back plate 16 (FIG. 3) arranged to cover a majority of the area between the base beams 6, 8. The movable structure is arranged between the front plane and the back plane and thus also between the first front plate 13 and the first back plate 16. In the shown embodiment the first front plate 13 and the first back plate 16 are essentially flat and coincide with the front plane and the back plane, respectively.

The mount 2 is arranged on the outside of the front plate 13 and connected to the movable structure 12 (FIG. 3). The stand 1 also comprises a first connecting means 18, and a second connecting means 19, arranged through the first slit 14 and the second slit 15, respectively, wherein each connecting means 18, 19, is connected to the movable structure 12 and the mount 2, which mount 2 comprises two horizontal rods 20, 21, on which a display is to be mounted. The connecting means 18, 19, are in the form of bent plates which can be seen most clearly in FIG. 4.

In the shown embodiment the front plate 13, seen towards the base beams perpendicular to the front plane, is arranged to cover a part of both base beams 6, 8, at a distance from the base beams 6, 8, so that the slits 14, 15, seen in cross section is curved. Handles 17 are arranged attached to the horizontal rods 20, 21, and the connecting means. As a large portion of the mass of the stand and the display is concentrated to the movable structure it is favourable to have the handles 17 attached in this way.

The front side of each base beam 6, 8, in cross section has a form comprising a main surface part 22, an inward surface part 23 defining the beginning of the slit 14, 15, with a convex bend 25 between the main surface part 22 and the inward surface part 23 and an inner surface part 24 with a concave bend 26 between the inward surface part 23 and the inner surface part 24, wherein the front plate 13, seen towards the base beams 6, 8, perpendicular to the front plane, is arranged to partially cover the inner surface part 24.

The inner surface part 27 is essentially flat and parallel to the front plane and the inward surface part 23 is essentially flat and perpendicular to the front plane. As can be seen in FIG. 2 the front plate 13 only covers a part of the inner surface part 26 and ends a small distance from the convex bend 25. The front plate 13 is also arranged a small distance from the inner surface part 27. The resulting slit 15 is L-formed. As can be seen in FIG. 4 the plate formed connecting means 19 is also L-formed to fit in the slit 15.

As can be seen in FIG. 3 the movable structure 12 comprises a first structure beam 28 and a second structure beam 29, which are arranged suspended in the base beams. Rolls 30 are arranged on the first base beam to support the structure beams 28, 29, of the movable structure 12 so that the movement of the movable structure 12 is parallel to the front plane and the back plane. The movable structure 12 also comprises at least one structure connecting member 31, which connects the structure beams 28, 29. Preferably, the base beams 6, 8, are provided with means 30 (FIG. 7) for providing a low friction between the structure beams 28, 29, and the base beams 6, 8. The means 30 may be plastic mats. The stand also comprises supporting means in the form of rolls 31 on which the structure beams 28, 29, may roll during their movement upwards and downwards along the base beams 6, 8.

The stand 1 comprises actuating means comprising a first electrical motor 32, a first screw 33 which is arranged to be driven by the first electrical motor 32, and a first nut member 34 which is arranged to interact with the first screw 33. The actuating means also comprises a second electrical motor 35, a second screw 36 which is arranged to be driven by the second electrical motor 35, and a second nut member 37 which is arranged to interact with the second screw 36. The motors 32, 35 and screws 33, 36, are arranged on the mid transversal beam 11 of the base 3 while the nut members 34, 37, are arranged non-rotatable on the structure connecting member 31 of the movable structure 12. The motors 32, 35, are arranged to rotate the screws 33, 36 in relation to the non-rotatable nut members 34, 37. This will lead to a movement of the nut members 34, 37, in relation to the motors and thus also to a movement of the movable structure 12 in relation to the base 3.

Figure 5:
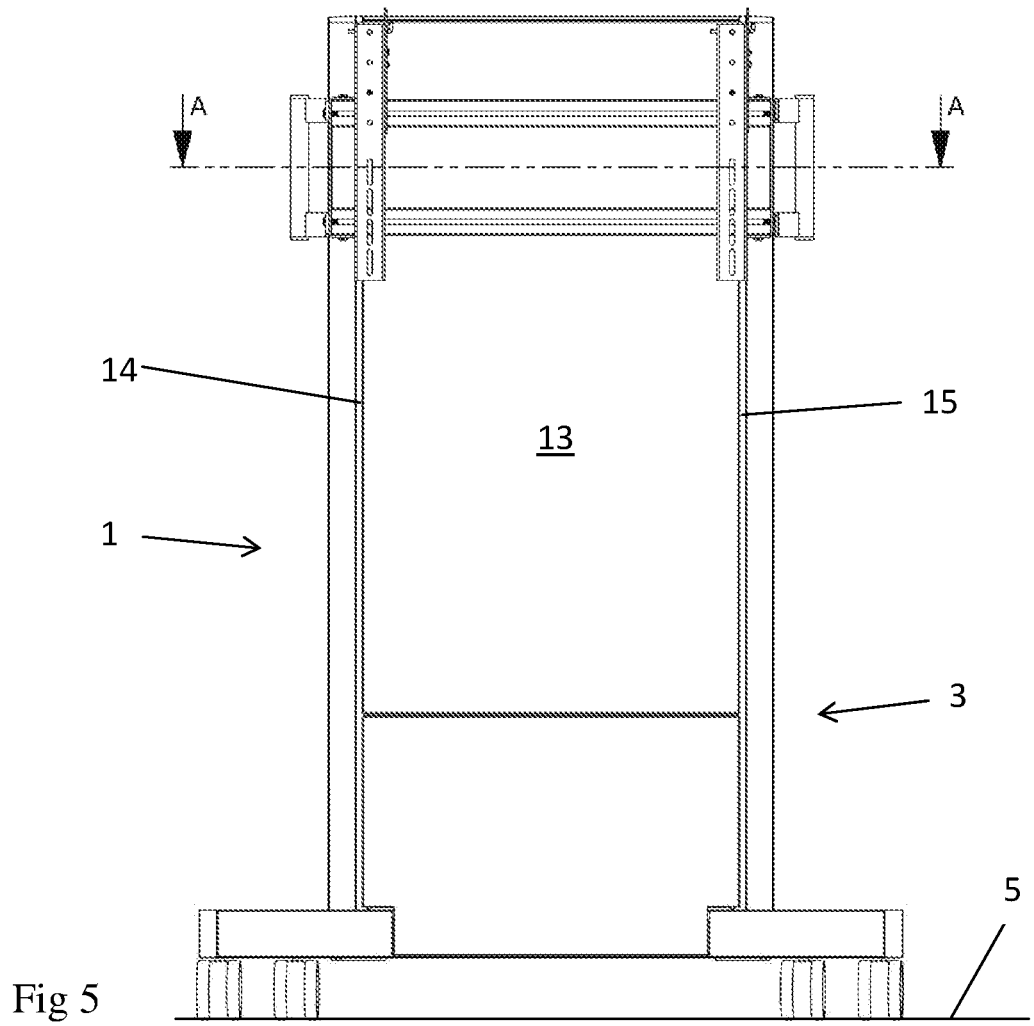
FIG. 5 is a front view of the stand in FIG. 1.
Figure 6:
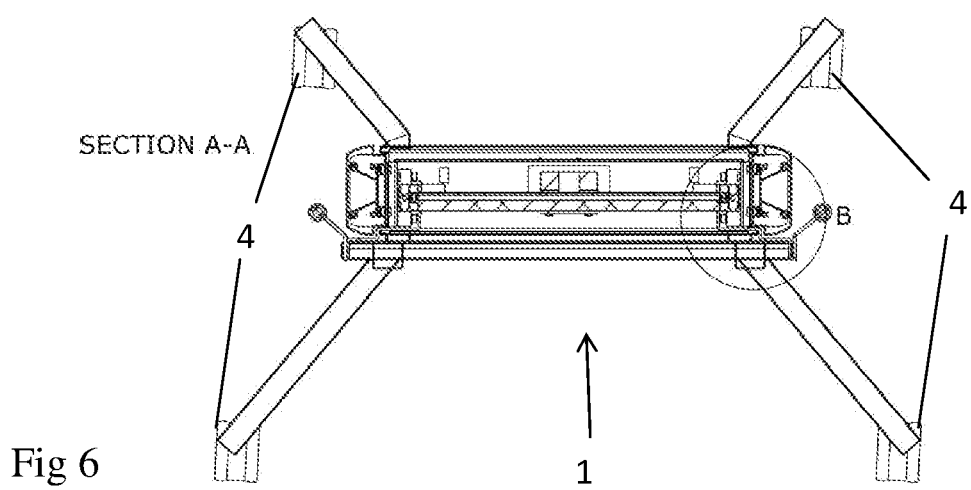
FIG. 6 is a section along A-A in FIG. 5.
Figure 7:
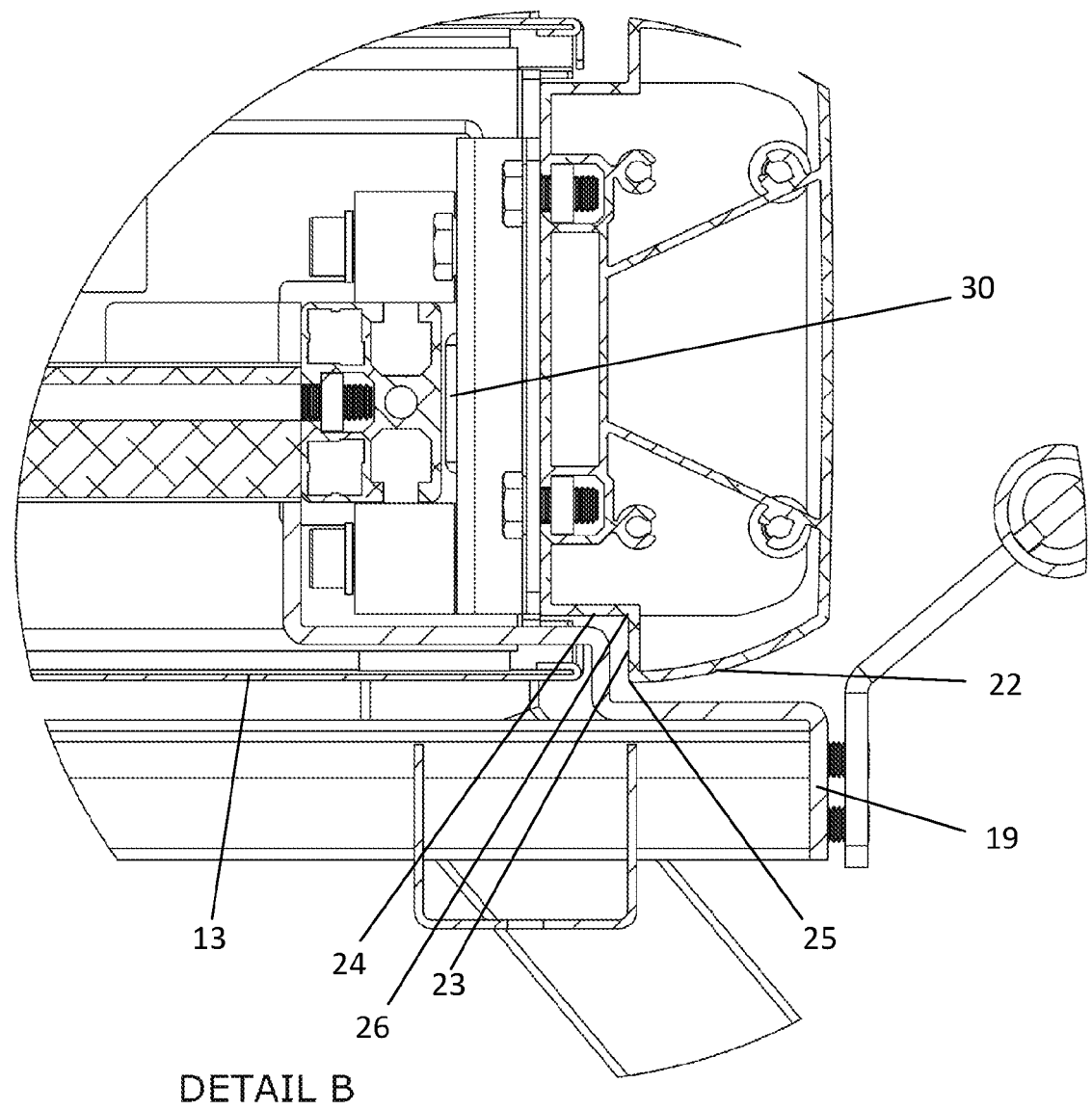
FIG. 7 is an enlargement of detail B in FIG. 6.

FIG. 5 is a front view of the stand 1 in FIG. 1. FIG. 6 is a section along A-A in FIG. 5 and FIG. 7 is an enlargement of detail B in FIG. 6. As can be seen in FIG. 5 a part of the inner surface part 24 is visible at the bottom of the slits 14, 15. In FIG. 7 the main surface part 22, the inward surface part 23 and the inner surface part 24 are shown in more detail. The convex bend 25 is a sharp 90 degree bend so that the inward surface part 23 is at a right angle to the front plate 13. The concave bend 26 is also a sharp 90 degree bend so that the inner surface part 24 is essentially parallel to the front plate 13.

Figure 8:
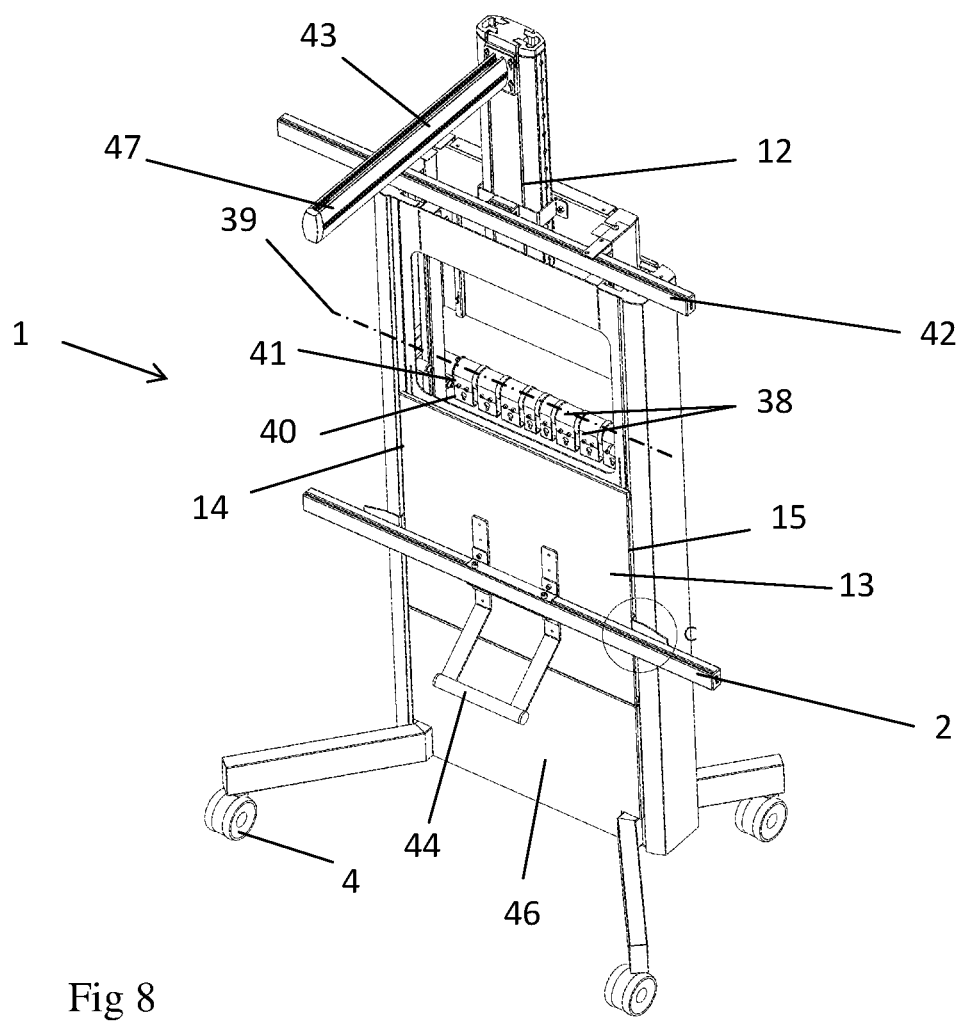
FIG. 8 is a front perspective view of a height adjustable stand according to a second embodiment of the present invention.
Figure 9:
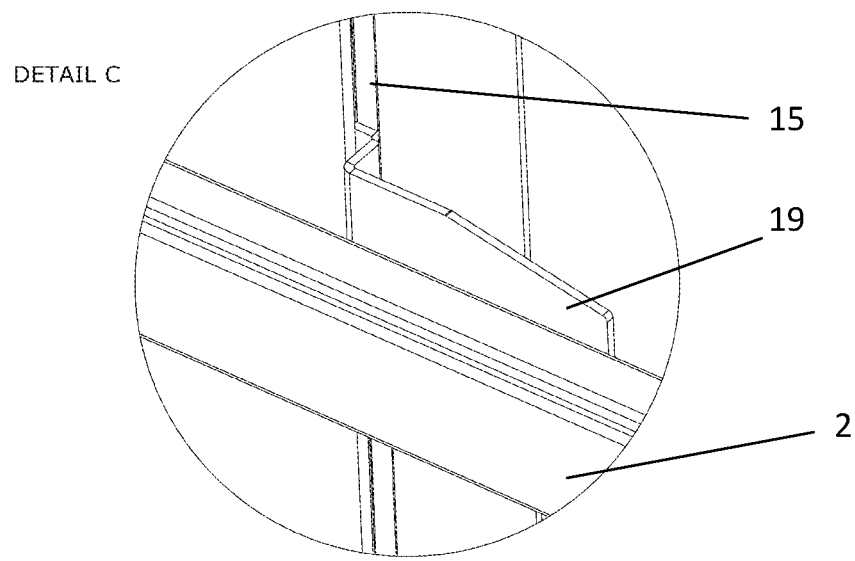
FIG. 9 is an enlargement of detail C in FIG. 8.
Figure 10:
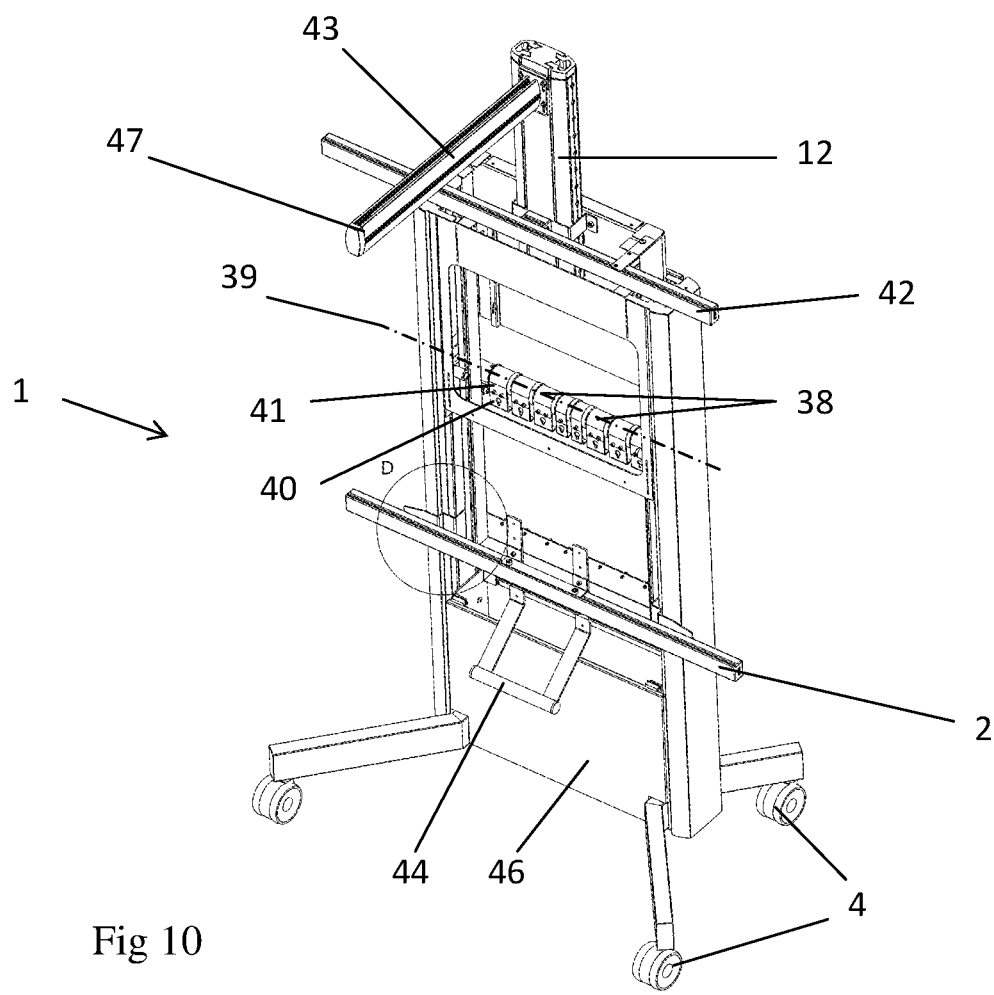
FIG. 10 is a front perspective view of the height adjustable stand in FIG. 8 with a front plate removed.
Figure 11:
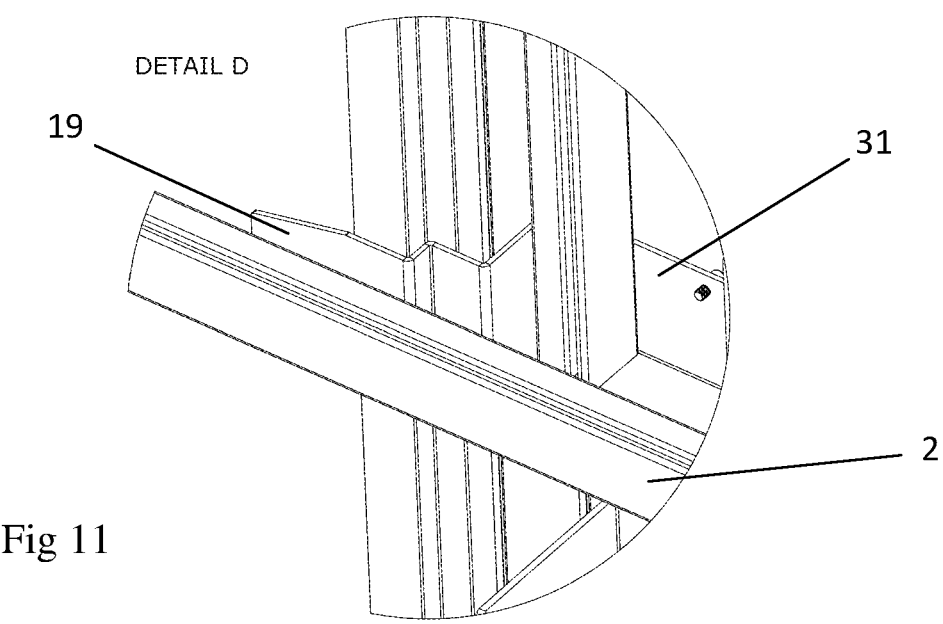
FIG. 11 is an enlargement of detail D in FIG. 10.

FIG. 8 is a front perspective view of a stand 1 according to a second embodiment of the present invention. FIG. 9 is an enlargement of detail C in FIG. 8. FIG. 10 is a front perspective view of the stand 1 in FIG. 8 with a front plate 13 removed. FIG. 11 is an enlargement of detail D in FIG. 10. The stand according to this second embodiment of the invention is similar to the stand 1 according to the first embodiment. A first main difference between the first embodiment and the second embodiment is that the actuating means comprises a number of roll formed coil springs 38 which are arranged to provide an upwardly directed force on the movable structure 12 in relation to the base 3. The force from said at least one roll formed coil spring 38 is balanced by the weight of the movable structure 12, the mount 2, the connecting means 19 and the display (not shown) together with the friction between the movable structure 12 and the base beams 6, 8, of the base 3. The roll formed coil springs 38 may of course be used also in the first embodiment instead of the motors 32, 35, screws 33, 36, and nut members 34, 37. The roll formed coil springs 38 are attached around an axle 39 which is attached to the base beams 6, 8, of the base 3. The roll formed coil springs 38 may either be rotatable in relation to the axle 39 or be fixed to the axle 39 which in turn is rotatable in relation to the base beams 6, 8. A plate 40 with a keyhole formed hole 41 is arranged in the outer end of each roll formed coil spring 38. The plates are to be connected to pins 45 arranged on the structure connecting member 31 of the movable structure 12. In FIG. 10 none of the plates are connected to a pin 45. The stand according to the second embodiment comprises a first front plate 13 which defines the first slit 14 and the second slit 15 together with the base beams 6, 8. The stand also comprises a second front plate 46 on the lower part of the stand behind which second front plate 46 electronic equipment may be arranged. The top of the stand is open as this area is usually covered by a projector screen.

A second main difference between the stand 1 according to the first embodiment and the stand 1 according to the second embodiment is that the movable structure 12 extends above the upper end of the first and second base beam 6, 8, and wherein the stand 1 comprises an upper mount 42 arranged on the part of the movable structure 12 extending above the upper end of the first and second base beam 6, 8, which upper mount 42 is arranged to receive the upper part of a projector screen (not shown). The stand also comprises a projector mount 43 arranged on the top of the movable structure 12, at the end 47 of which projector mount 43 a short throw projector (not shown) may be arranged. A handle 44 is arranged attached on the lower side of the mount 2.

As is shown in FIG. 11 the connecting means 19 are a continuation of the structure connecting member 31. Also shown in FIG. 11 is that the mount 2 only comprises one horizontal rod 20.

Figure 12:
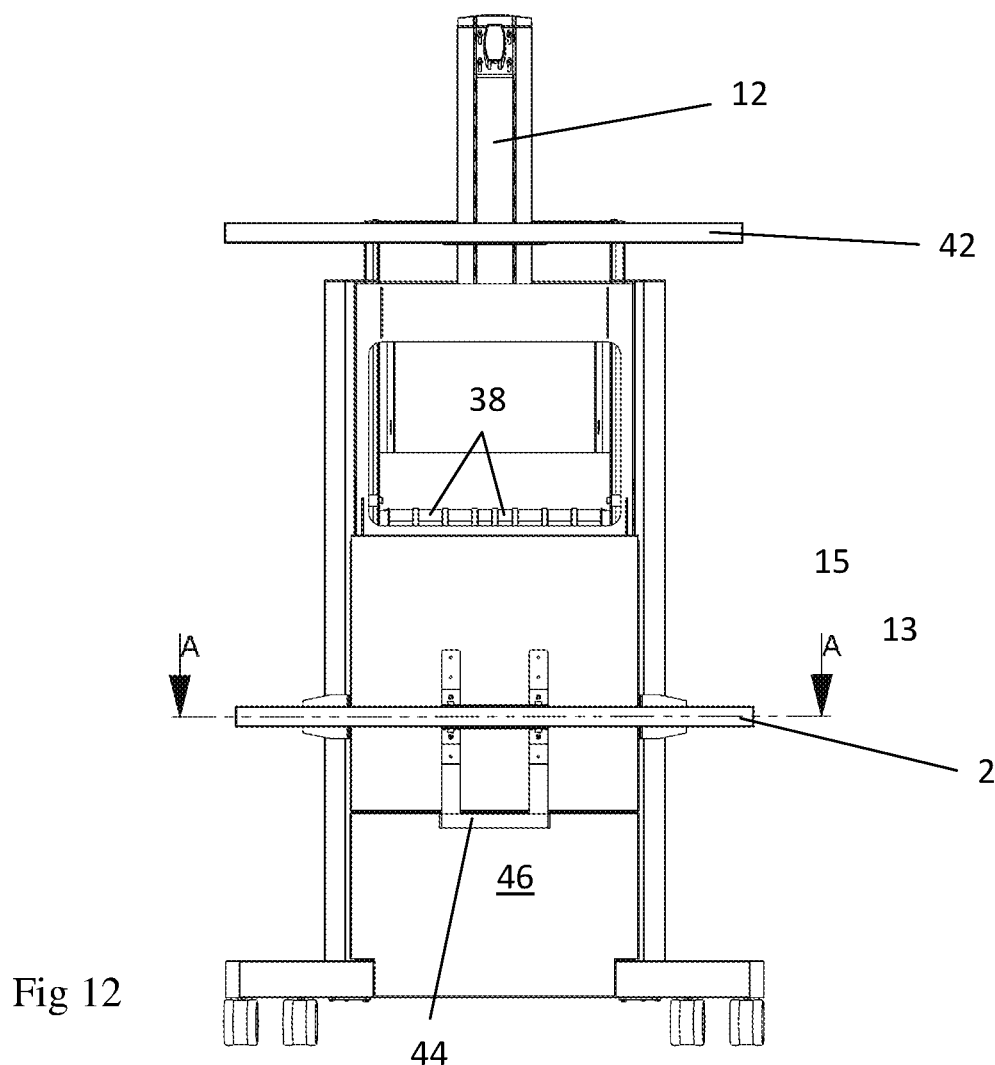
FIG. 12 is a front view of the stand in FIG. 1.
Figure 13:
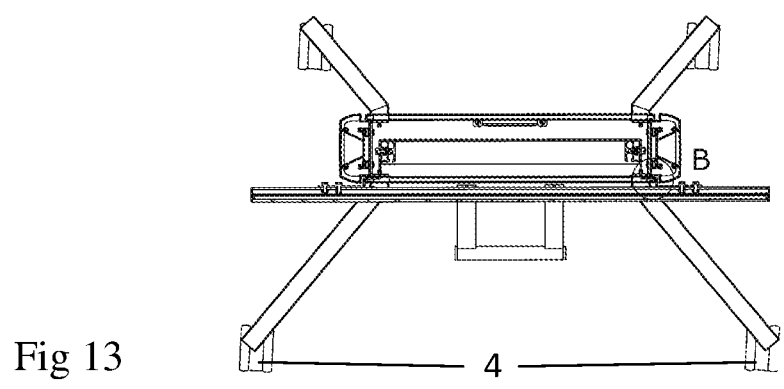
FIG. 13 is a section along A-A in FIG. 5.
Figure 14:
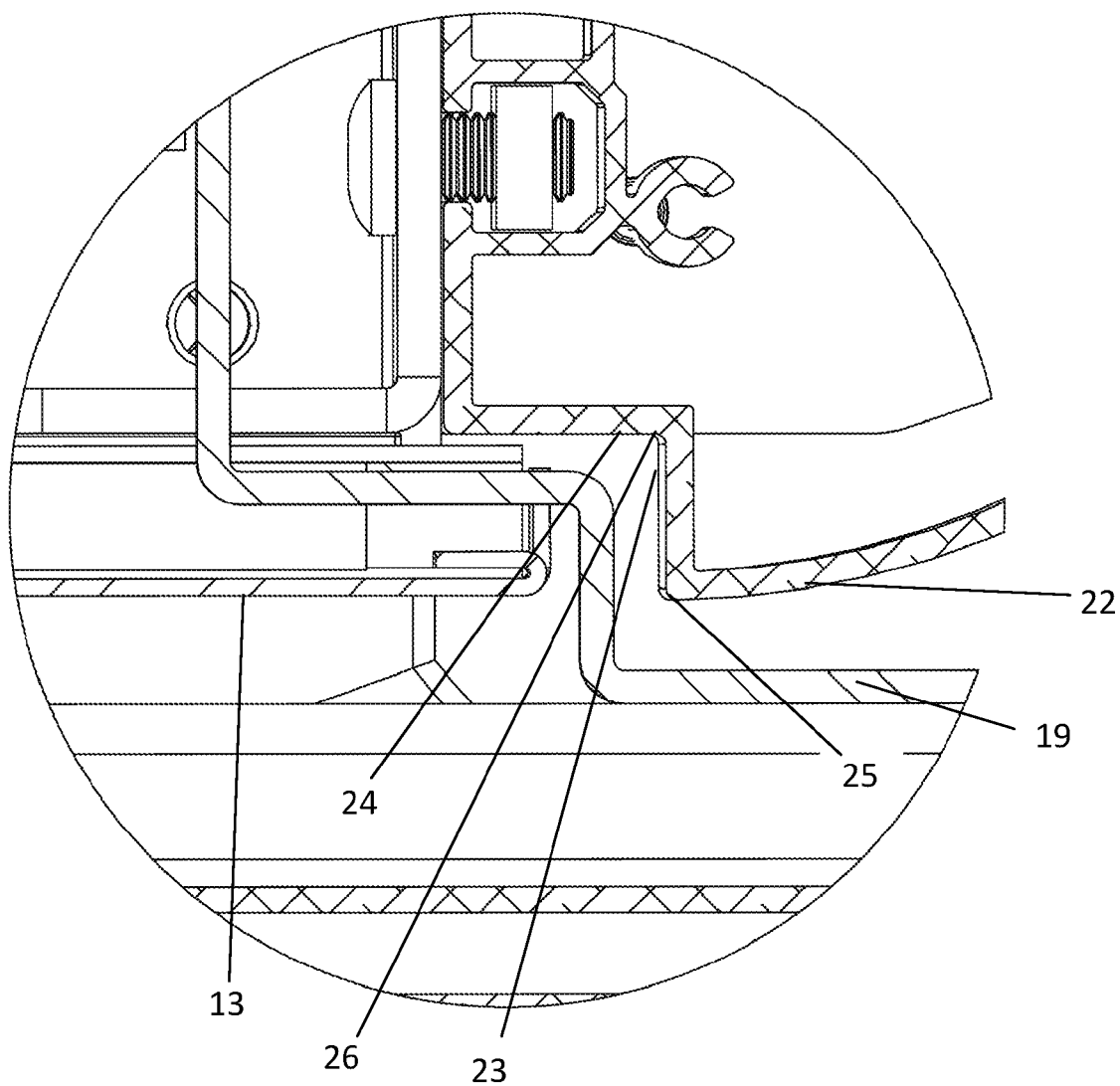
FIG. 14 is an enlargement of detail B in FIG. 6.

FIG. 12 is a front view of the stand in FIG. 1. FIG. 13 is a section along A-A in FIG. 12. FIG. 14 is an enlargement of detail B in FIG. 13.

The described embodiments may be modified in many ways without departing from the spirit and scope of the present invention which is limited only by the appended claims.

It is possible to arrange rolls between the structure beams and the base beams in other way than has been described above.

It is possible to have the base without any wheels.

The invention claimed is:

1. A height adjustable stand for a projector screen or a display comprising a base for arrangement on a floor, at least a first base beam with a first length axis and a second base beam with a second length axis, which length axes are essentially parallel and arranged to be essentially vertical when the base is arranged on the floor, wherein the back sides of the base beams define a vertical back plane and the front sides of the base beams define a vertical front plane, at least one base connecting member which connects the base beams, and a movable structure which is movable along the base beams and which is arranged between the front plane and the back plane, wherein the stand comprises:

at least a first front plate which is arranged with a first vertical slit between the front plate and the first base beam, and a second vertical slit between the front plate and the second base beam, wherein the front plate, viewed towards the base beams perpendicular to the front plane, is arranged to cover a part of both base beams at a distance from the base beams, so that the slits viewed in cross section are curved, and wherein the front side of each base beam in cross section has a form comprising a main surface part, an inward surface part defining the beginning of the vertical slit with a convex bend between the main surface part and the inward surface part and an inner surface part with a concave bend between the inward surface part and the inner surface part, and wherein the front plate, viewed towards the base beams perpendicular to the front plane, is arranged to cover the inner surface part at least partially, at least a first back plate arranged to cover a majority of the area between the base beams, a mount arranged on the outside of the front plate and connected to the movable structure, and a first connecting means and a second connecting means arranged through the first slit and the second slit, respectively, wherein each connecting means is connected to the movable structure and the mount, which mount is arranged to receive the projector screen or the display.

2. The stand according to claim 1, wherein each connecting means comprises at least one plate.

3. The stand according to claim 1, wherein the back plate is essentially flat and is arranged essentially in the back plane.

4. The stand according to claim 1, wherein the front plate is essentially flat and is arranged essentially in the front plane.

5. The stand according to claim 1, wherein the inner surface part is essentially flat and parallel to the front plane.

6. The stand according to claim 1, wherein the inward surface part is essentially flat and perpendicular to the front plane.

7. The stand according to claim 1, wherein the movable structure comprises a first structure beam and a second structure beam, which are arranged suspended in the base beams, and at least one structure connecting member, which connects the structure beams.

8. The stand according to claim 7, comprising actuating means which is arranged to provide an upward force on the movable structure in relation to the base.

9. The stand according to claim 8, wherein the actuating means is arranged to provide a force between the base connecting member and the structure connecting member.

10. The stand according to claim 8, wherein the actuating means comprises at least one screw, at least one nut member and at least one electrical motor which is arranged to drive at least one of said at least one screw and said at least one nut member.

11. The stand according to claim 10, wherein the at least one screw is arranged on the base and is arranged to be driven by said at least one electrical motor and the nut member is arranged on the movable structure.

12. The stand according to claim 8, wherein the actuating means comprises at least one roll formed coil spring which is arranged to provide an upwardly directed force on the movable structure in relation to the base.

13. The stand according to claim 1, wherein the movable structure extends above the upper end of the first and second base beam, and wherein the stand comprises an upper mount arranged on the part of the movable structure extending above the upper end of the first and second base beams, which upper mount is arranged to receive the upper part of the projector screen or the display.

* * * * *